Jan. 15, 1957  E. PIQUEREZ  2,777,282
FLUIDTIGHT WATCHCASE
Filed May 5, 1953

United States Patent Office 2,777,282
Patented Jan. 15, 1957

2,777,282

FLUIDTIGHT WATCHCASE

Erwin Piquerez, Bassecourt, Switzerland

Application May 5, 1953, Serial No. 353,072

Claims priority, application Switzerland May 12, 1952

2 Claims. (Cl. 58—90)

My invention has for its object a fluidtight watchcase of the type including two parts fitted inside one another with the insertion of a packing therebetween; according to a primary object of my invention the cross-section of said packing is substantially triangular before it is clamped in position and it bears through one of the flat surfaces of the triangular body thus defined against one of said two interengaging parts and through the ridge opposed to said surface against the other part.

I have illustrated by way of example in accompanying drawing a preferred embodiment of the object of my invention. In said drawing.

Figure 1:
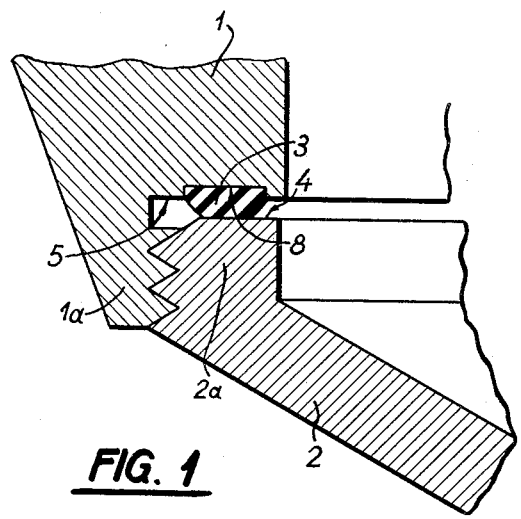
Fig. 1 is a partial cross-section of a watchcase through an axial plane, said watchcase incorporating my improved packing.
Figure 2:
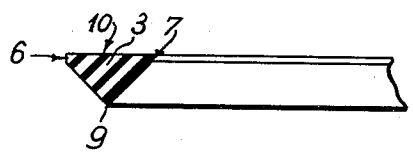
Fig. 2 is a cross-section of the packing shown separate.

The watchcase illustrated includes a body or band 1 into the flange 1a of which is screwed a bottom 2. A packing 3 is fitted in the joint between the transverse surface 4 of the flange 2a raised on the bottom 2 and the cooperating transverse surface 5 of the band. Said packing which is adapted to provide for fluidtightness between the bottom and the band has, when inoperative, a substantially triangular cross-section as shown in Fig. 2; two corners of the triangle have been bevelled as shown at 6 and 7 in Fig. 2 so as to form two coaxial annular surfaces wherethrough the packing may be fitted inside an annular groove 8 formed in the transverse surface 5 of the band; the packing remains thus permanently attached to the band and does not drop out of the latter when the bottom is removed. Said bottom bears through its transverse surface 4 against the annular ridge 9 of the packing 3 defined by the apex of its cross-section opposed to the flat surface 10 engaging the band.

The packing 3 may be made of any suitable plastic material such as that sold under the trade name "Plexigum" or it may be made of a metal, preferably a soft metal.

What I claim is:

1. In a fluidtight watchcase, the combination of a case including two components, a case band and a case bottom adapted to be secured coaxially one inside the other and having each a plane surface perpendicular to the axis of the case, the plane surfaces facing each other and the plane surface formed on one of the case components being provided with an annular shallow groove facing the plane surface on the other component and extending transversely between two short surfaces coaxial with the case, and an annular elastic packing inserted between said plane surfaces and including a first annular section having a cross-section matching exactly the shallow groove and fitted therein and a second annular section in one with the first section and the cross-section of which through a radial plane is in the form of an isosceles triangle, the base of which registers with the outer surface of the first section lying in said plane surface of said one component and the two remaining sides of which triangle converge towards an apex facing the plane surface of the second component, the ridge formed by the apex of the cross-section of said second section of the packing being compressed and flattened by said plane surface on the second component of the case upon operative fitting of the two case components with reference to each other.

2. In a fluidtight watchcase, the combination of a case including two components, a case band and a case bottom adapted to be secured coaxially inside each other and having each a plane surface perpendicular to the axis of the case, the plane surfaces facing each other and the plane surface formed on the case band being provided with an annular shallow groove facing the plane surface on the case bottom and extending transversely between two short surfaces coaxial with the case, and an annular elastic packing inserted between said plane surfaces and including a first annular section having a cross-section matching exactly the shallow groove and fitted therein and a second annular section in one with the first section and the cross-section of which through a radial plane is in the form of an isosceles triangle, the base of which registers with the outer surface of the first section lying in said plane surface of said one component and the two remaining sides of which triangle converge towards an apex facing the plane surface of the case bottom, the ridge formed by the apex of the cross-section of said second section of the packing being compressed and flattened by said plane surface on the bottom of the case upon operative fitting of the two case components with reference to each other.

References Cited in the file of this patent

UNITED STATES PATENTS 1,268,821   Depollier _____ June 11, 1918

FOREIGN PATENTS 368,866   Great Britain _____ Mar. 17, 1932